3,682,771
Patented Aug. 8, 1972

3,682,771
EMERGENCY NUCLEAR REACTOR SHUTDOWN SYSTEMS
John Charles Bennett, Great Bookham, Leatherhead, England, assignor to Atomic Power Constructions Limited, Surrey, England
Filed Nov. 18, 1968, Ser. No. 776,446
Claims priority, application Great Britain, Nov. 30, 1967, 54,503/67
Int. Cl. G21c 7/08
U.S. Cl. 176—35     3 Claims

ABSTRACT OF THE DISCLOSURE

An emergency shut-down system for a gas-cooled, graphite-moderated reactor comprises a U-shaped tube with one limb located within the core and the other located externally thereof. Inside the tube for movement therein is a first column of spheres of neutron absorbing material. Connected to the external limb of the tube is a reservoir for a second column of spheres of non-neutron absorbing material. The two columns are in endwise contact inside the tube. When the second column of spheres is released, its greater weight urges the first column into the reactor core and retains it there.

BACKGROUND OF THE INVENTION

This invention relates to emergency shut-down systems for nuclear reactors and has particular but not exclusive reference to the injection of neutron absorbing material into the core of a nuclear reactor for that purpose.

Nuclear reactors usually incorporate an emergency shut-down system which injects some form of neutron absorbing material into the core. This emergency shut-down system has as a basic requirement that injection of the neutron absorbing material should be simple and that the neutron absorber should remain in the core in the event of any credible failure in the reactor system.

Hitherto, this emergency shutdown system has been commonly provided by the normal reactor control rods. These control rods, which, in the relevant cases, are inserted through the roof of the reactor, are raised and lowered by means of a motor which operates via a clutch. In an emergency the clutches are disengaged and the control rods allowed to fall into the reactor, and to shut-down the reactor.

This system is satisfactory provided that the control rods are allowed to fall and are not obstructed during their descent. If a fault occurs which prevents the passage of control rods into the core, it may not be possible to shut-down the reactor unless a secondary shut-down system is provided.

The present invention provides a secondary emergency shut-down system which functions independently of the normal control rods, and is, moreover, associated with the bottom face of the reactor and consequently is inherently less likely to have been affected by the fault which has prevented an emergency control-rod-instigated shut-down.

SUMMARY OF THE INVENTION

According to the present invention a nuclear reactor having a nuclear core with a bottom face includes an emergency shut-down system comprising in combination at least one channel extending into said core from said bottom face thereof, at least one U-shaped tube having one leg extending into said channel and another leg located externally of said core, and, inside the tube, a first column of spheres of neutron absorbing material for movement in said tube, a reservoir connected to said other leg, a second column of spheres of non-neutron-absorbing material, the total weight of spheres in the second column being greater than that of the spheres in the first column, the two columns being in endwise contact inside the tube, the second column being located, in non-shut-down conditions, partly in said tube and partly in said reservoir whereby the first column is positioned clear of said channel, and means for releasing spheres of said second column to move, on shut-down, from said reservoir into said tube to cause said first column to be moved into said channel and to be retained therein by the greater weight of said second column.

The neutron absorbing material may be boron. The spheres of the first column of spheres may be hollow whilst those of the second column may be solid.

There may be provided decelerating means in the first leg of the U tube to decelerate the shut-down material as it approaches the upper end of the first leg of the U tube.

The decelerating means may comprise a fluid flow constriction at the upper end of the first leg of the U tube.

There may be provided releasable means for retaining the shut-down material outside the core of the reactor.

There may be provided a further tube having a first end adjacent the top of the first leg and the second end connected to the second leg adjacent the insertion means. The tube may be provided with a one-way valve which only permits fluid flow from the end adjacent the top of the first leg to the second leg.

DESCRIPTION OF THE PREFERRED EMBODIMENTS

Figure 1:
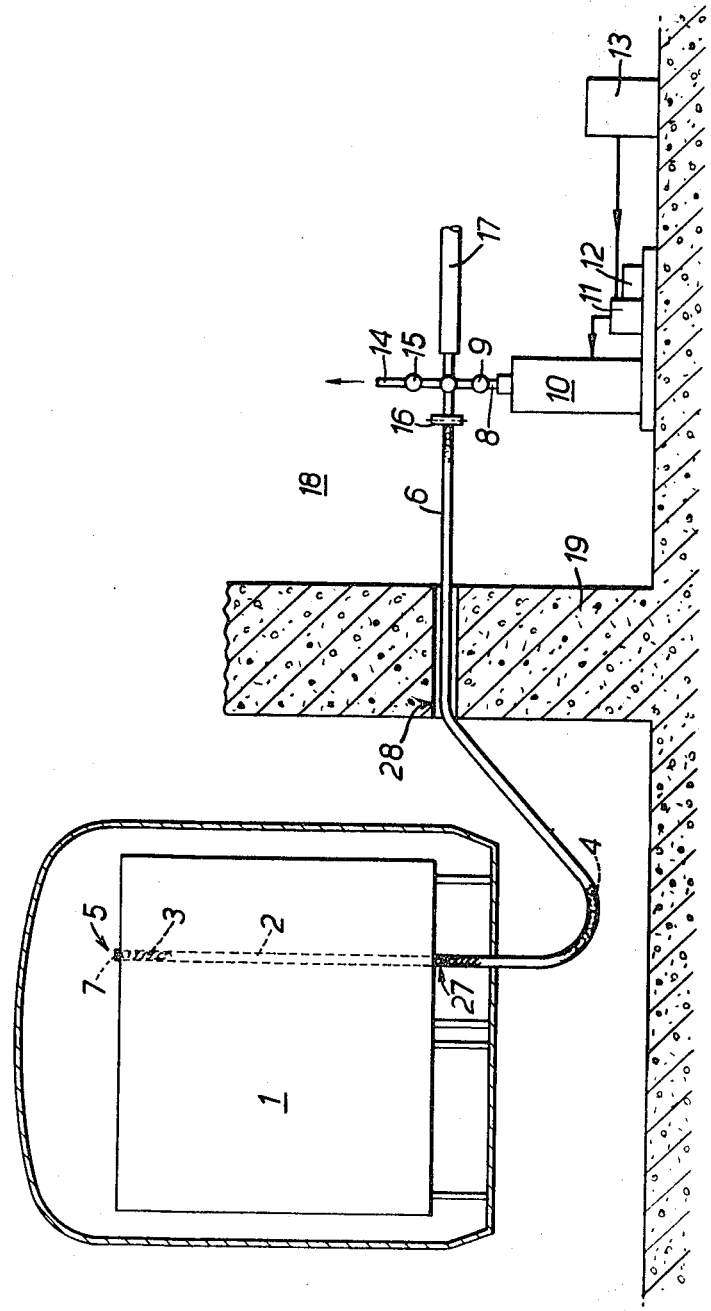
FIG. 1 is a cross-section of a part of a reactor and the injection system.

FIG. 1 shows a nuclear reactor of the gas-cooled type having a core 1 fitted with a number of tubes 2 e.g. zirconium alloy, or any other suitable low neutron absorbent material compatible with the core environment, for the insertion of emergency shut-down neutron absorbing bodies 3. The bodies 3 are hollow spheres, formed of, for example, stainless steel internally coated with cadmium or boron carbide, or a boron steel. The heavy bodies 4 are of solid steel. The end of the tube 2 is partially closed by a restrictor 7 which serves to prevent ejection of the bodies 3 into the core surroundings.

The end 6 of the tube is connected to the source of pressurised insertion gas 8 via a valve 9. The insertion gas which is preferably the same as the coolant gas is stored in a high pressure cylinder 10 and the gas may be pressurized by the compressor 11 driven by the motor 12 from a storage container 13 or may be stored in the cylinder 10 at a very high pressure and be fed to the source 8 via a pressure reducing valve (not shown). The gas line 14 which is connected to the tube 2 via the valve 15 is a pressure release or blow-off valve. The balls 3 and 4 are normally retained within the tube 2 by the removable barrier 16, but they may be withdrawn from the tube by removing the barrier 16 and extracted through the ball removal tube 17, for replacement or inspection, etc. The pressurising arrangement is housed in a room 18 adjacent the concrete pressure vessel 19.

During normal operation of the reactor, the neutron absorbing bodies 3 must remain outside the core 1. This end can be achieved in a number of different ways. In the arrangement illustrated in FIG. 1, the standby, inoperative position of the first hollow body is shown by the arrow 27, and the standby position of the first solid body is shown by the arrow 28. In this position the U of the insertion tube is entirely filled with hollow bodies and because the height of each limb is equal and the solid bodies are in a horizontal part of the insertion tube, then the standby position is stable.

When the device has been operated by opening the valve 9 and allowing high pressure gas from the cylinder 10 to blow the bodies along the tube 2, the hollow bodies fill the tube within the reactor core and their weight is balanced by the solid bodies in the limb of the U tube outside the reactor. If, however, the bottom of the reactor core 1 is below the horizontal portion of the insertion tube then the hollow bodies can be kept out of the reactor core by having a small number of solid bodies on top of the left-hand column of hollow bodies (as seen in FIG. 1). The solid bodies will depress the column and keep the column out of the reactor core in the standby position. The system will still operate exactly as described above for the left-hand side which has only hollow bodies.

Figure 2:
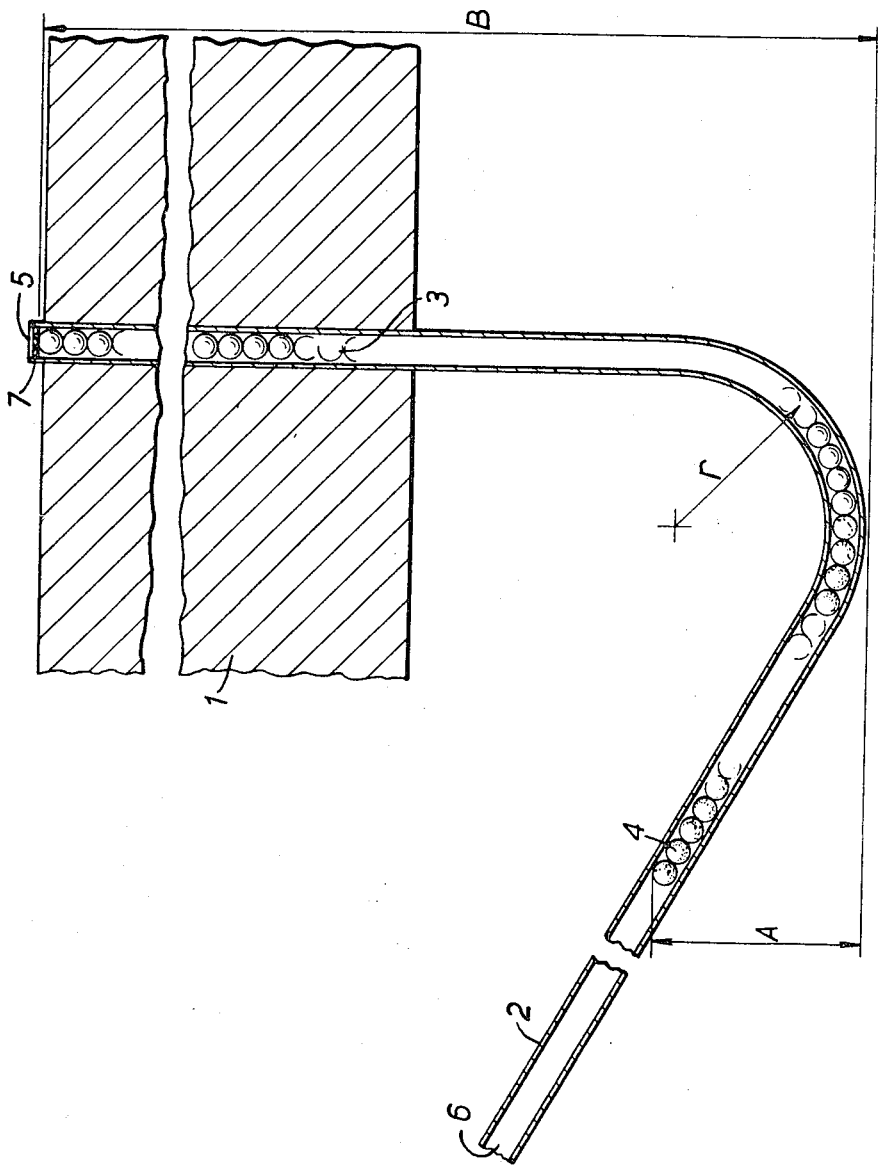
FIG. 2 is a diagrammatic across-section of the U tube.

In the embodiment shown in FIG. 2, however, in which the insertion tube is a simple U tube, a locking mechanism is needed to prevent the solid bodies from forcing the hollow bodies up into the reactor core in the standby position. This locking mechanism would have to be released when the system is operated.

The body storage tube outside the concrete pressure vessel may be formed into a compact helical coil to form a reservoir for the train of bodies 3 and 4. Alternatively, a more open form of storage might be provided; the only limitation imposed on the storage arrangement is that it must feed the bodies into the tube 2 without any possibility whatever of their jamming, and that it must feed the necessary number of the bodies 3 before feeding the bodies 4.

In certain cases it may be necessary to provide some retardation of the train of bodies as they approach the full insertion position. Retardation must be controlled in order to prevent possible damage to the bodies. Controlled retardation may be achieved by means of a spring device in the upper end of the tube 2, or it may be achieved by modifying the insertion gas flow during the latter part of the insertion. This flow modification can be achieved by increasing the containing tube diameter towards its upper end, or by introducing side gas ports into the upper end of the tube.

Once the train has been fully inserted the ambient pressures at the ends 5 and 6 of the tube will be equalised by leakage of the gas from the high pressure cylinder 10 along the tube 2, and the column A of heavy bodies 4 will support the column B of equal weight neutron absorbing bodies 3. It is preferable to ensure that column A is heavier than column B; and a typical safety factor of 2 would be applied.

In a further embodiment of the invention a pressure relief tube (not shown) is run from the end 5 to a point between the position 28 and the cylinder 10. The pressure relief tube incorporates a one-way valve which only allows gas to flow from the end 5 to the cylinder 10 and thus prevents the high pressure insertion gas venting through the pressure relief tube. The purpose of this tube is to prevent the bodies being blown back down the tube should the pressure at the end 5 rise after pressure equalisation by leakage from the cylinder 10 has occurred. Such a pressure rise could be caused, for example, by a fire in the reactor heating and expanding the gas within the reactor. A pressure rise of this kind would cause gas to flow down the pressure relief tube through the one-way valve, and equalise the pressure at either end of the train of bodies.

The shape of the U tube is very much a matter of design for the individual reactor. However, there are several conditions which are applicable in concept to all designs.

The radius $r$ at the bottom of the U tube should preferably be at least 10 times the diameter of the spherical bodies 3, 4. These bodies should be a clearance fit in the internal diameter of the tube 2, a suitable size for the bodies being approximately 3½% less in diameter than the tube.

The hollow bodies should each have a small hole drilled in them to prevent them from being crushed or burst by changes in the external pressure.

The height of the column A with regard to the height of the column B is easily calculable for static conditions. If the diameter of the tube is the same along its length and the diameter of the spheres 3 and 4 is the same, then the product of A times the density of the balls 4 must equal B times the density of the balls 3 (assuming that the junction between the balls 3 and 4 is exactly at the lowest point of the U). In the case where the diameter of the tube 2 is 1.550 inches inside diameter, the diameter of the spheres 3, 4 is 1.500 inches and the hollow bodies 3 have a wall thickness of 1/32 inch, then the weight ratio of the spheres 3:4 is 1:8 approximately. Thus with a height of 17 feet for B and a safety factor of 2, as described above, the height A must be at least $$\frac{17 \times 2}{8} = 4.25 \text{ feet}$$

The arm containing the spheres 4 could be vertical, but preferably the arm is inclined at approximately 30° to the horizontal.

Figure 3:
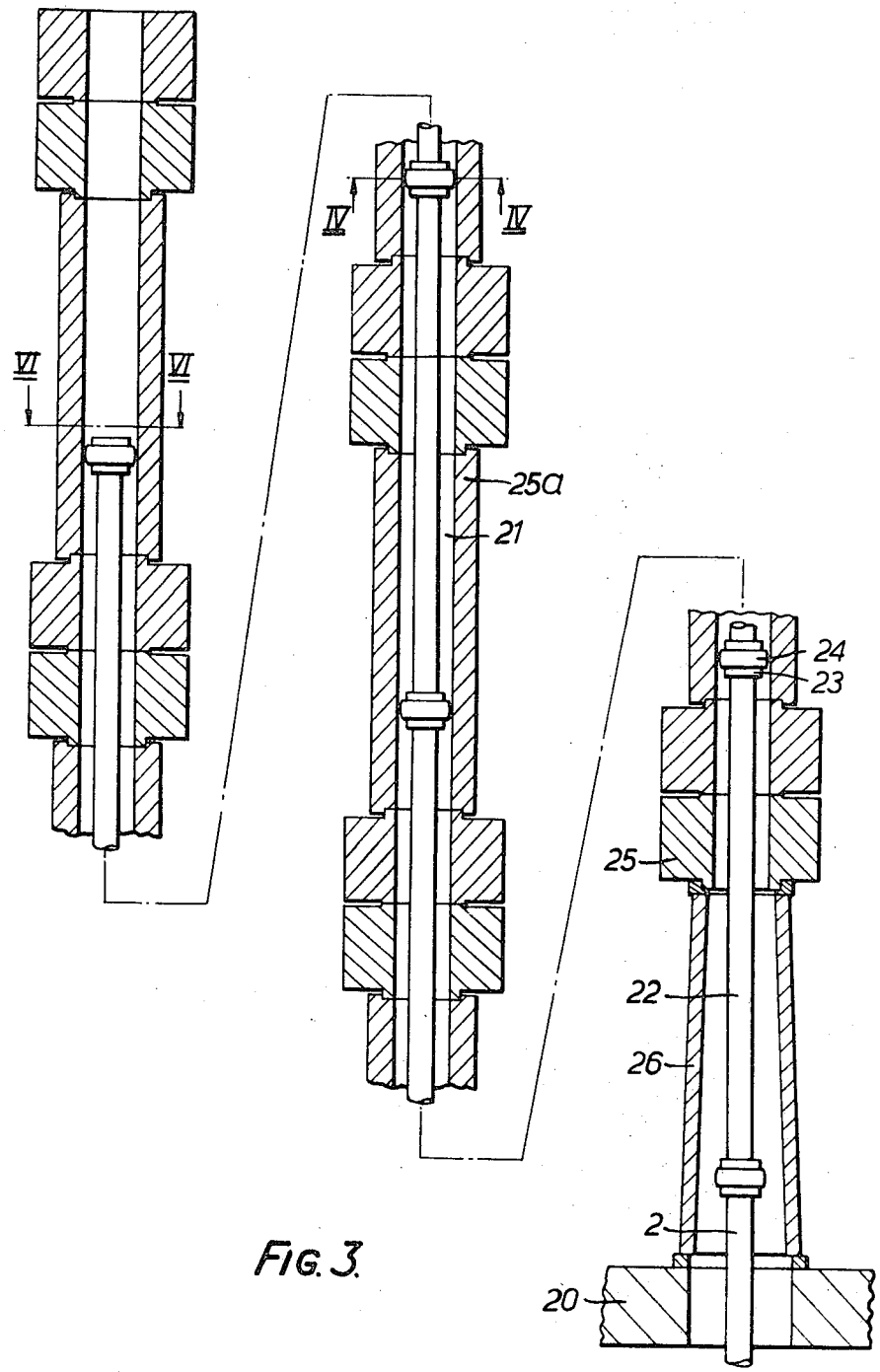
FIG. 3 is a detailed cross-section of one arm of the U tube.
Figure 4:
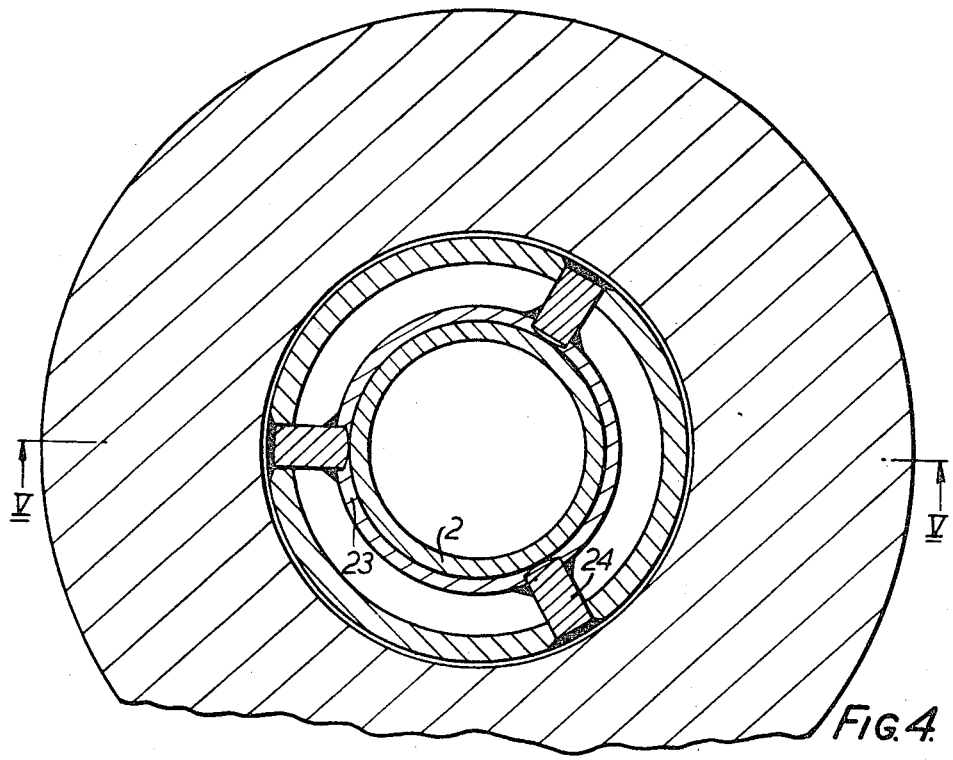
FIG. 4 is a section along the line IV—IV of FIG. 3.
Figure 5:
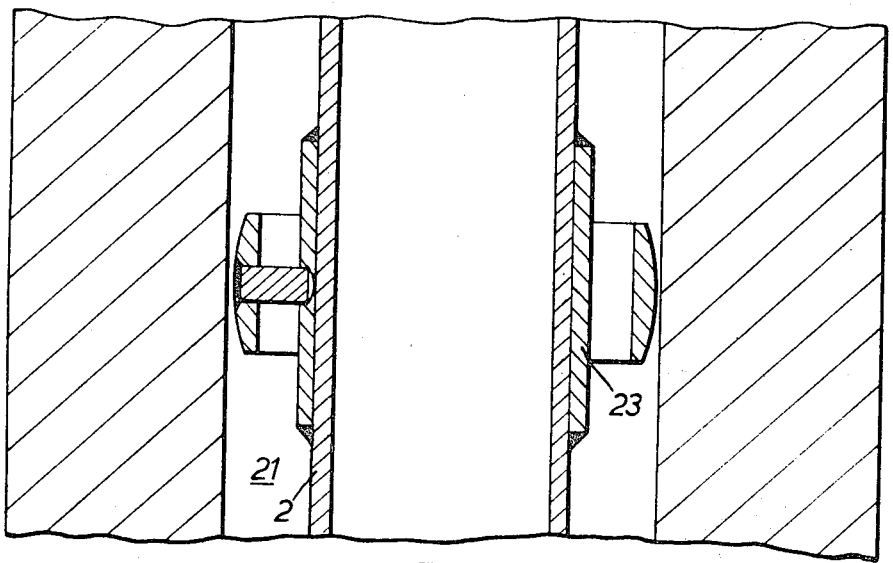
FIG. 5 is a section along the line V—V of FIG. 4.
Figure 6:
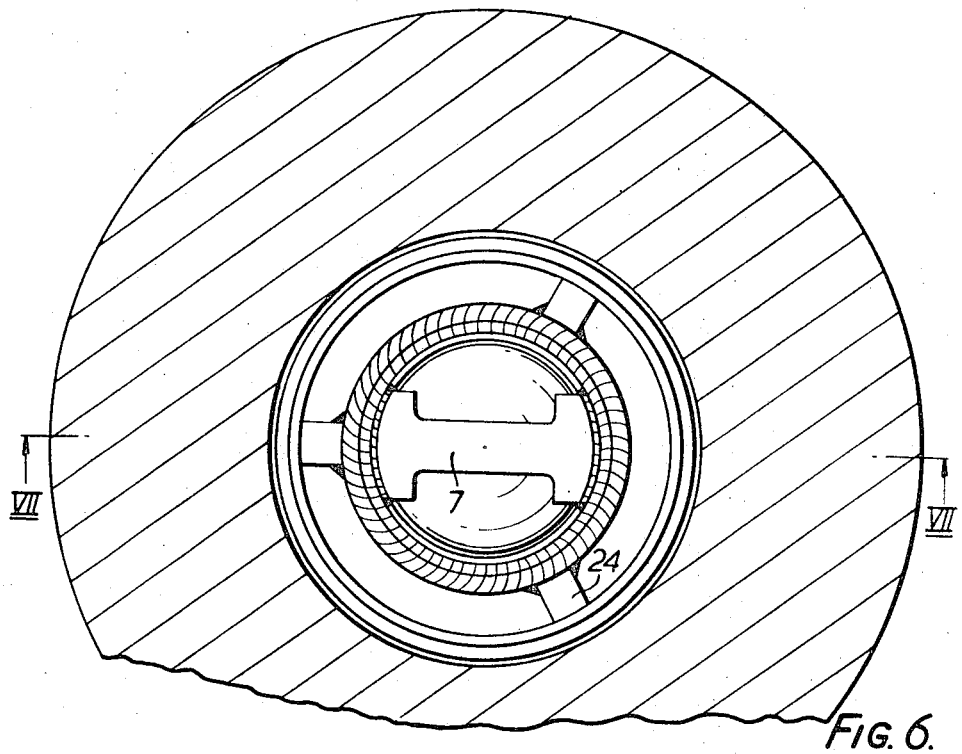
FIG. 6 is a section along the line VI—VI of FIG. 3.

The tube 2 shown in FIG. 3 is that portion of the tube which is housed within the core of the reactor, and the lowest portion of the tube enters the core through the core levelling plate 20. The tube is situated in an interstitial channel through the reactor 21 which is a coolant flow path. Typically there may be twenty-one such tubes in a core. The tube is divided into nine lengths 22 of which only two complete lengths are shown. The joints between the lengths are made by welding a short piece of tube 23 over the abutting ends of adjacent lengths. Onto this tube 23 is weld a spacer 24 which serves to locate the tube 2 within the channel 21.

Figure 7:
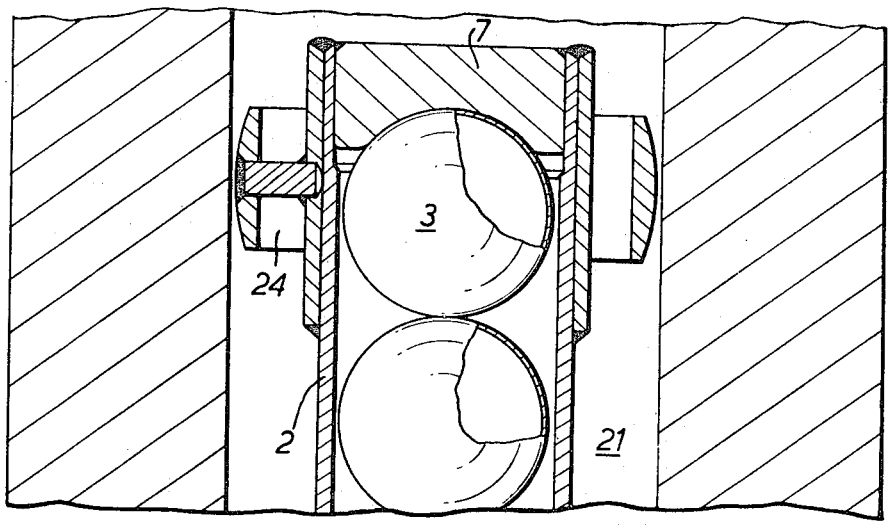
FIG. 7 is a section along the line VII—VII of FIG. 6.

The end of the tube 2 is fitted with a stop shown as 7 in FIG. 7 which is welded across the tube 2. The end of the tube also carries a spacer 24 which locates the end of the tube within the channel 21. The blocks 25a are the in-fill blocks, and the blocks 25 are interstitial keys as described in British patent specification No. 1,215,318 which key together the main reactor core moderator blocks. The lowest of these blocks is connected to the levelling plate 20 by a truncated conical stool 26. Alternatively the tube 2 can be accommodated in a main lattice channel.

To return the bodies to the standby position from the in use position the valve 15 is opened and the pressure in the feed line is vented, thus the excess pressure within the reactor causes the bodies to be forced back down the tube and into the standby position. If there is no excess pressure in the reactor, the insertion line can be evacuated through the line 14, or an excess pressure can be applied to the end 5 of the tube 2 if this end is accessible in a particular reactor.

It will be appreciated that the bodies 3, 4 need not be precisely spherical. They could be for example cylindrical, or ellipsoidal. In the case of non-spherical bodies, the radius $r$ and the amount of oversize of the tube 2 may have to be greater than 3½% of the body diameter.

I claim:

1. In a nuclear reactor having a nuclear core with a bottom face, an emergency shut-down system comprising in combination at least one channel extending into said core from said bottom face thereof, at least one U-shaped tube having one leg extending into said channel and another leg located externally of said core, and, inside the tube, a first column of spheres of neutron absorbing material for movement in said tube, a reservoir connected to said other leg, a second column of spheres of non-neutron-absorbing material, the total weight of spheres in the second column being greater than that of the spheres in the first column, the two columns being in endwise contact inside the tube, the second column being located, in non-shut-down conditions, partly in said tube and partly in said reservoir whereby the first column is positioned clear of said channel, and means for releasing spheres of said second column to move, on shut-down, from said reservoir into said tube to cause said first column to be moved into said channel and to be retained therein by the greater weight of said second column.

2. A nuclear reactor as claimed in claim 1 in which said reservoir comprises a substantially horizontal length of tube connected to said other leg.

3. A nuclear reactor as claimed in claim 1 in which said means comprises a source of gaseous pressure and control means interconnected between said source and said reservoir to control the application of gaseous pressure to said second column.

References Cited

UNITED STATES PATENTS

| | | | |
|---|---|---|---|
| 2,910,416 | 10/1959 | Daniels | 176—17 |
| 3,257,286 | 6/1966 | Ryon et al. | 176—86 X |
| 3,375,170 | 3/1968 | Stubley | 176—35 |
| 3,498,881 | 3/1970 | Siddall | 176—86 |

FOREIGN PATENTS

| | | | |
|---|---|---|---|
| 998,933 | 7/1965 | Great Britain | 176—35 |
| 1,023,510 | 3/1966 | Great Britain | 176—36 |
| 1,125,562 | 3/1962 | Germany | 176—86 |
| 1,246,896 | 8/1967 | Germany | 176—86 |

BENJAMIN R. PADGETT, Primary Examiner

H. E. BEHREND, Assistant Examiner

U.S. Cl. XR.

176—36 R, 36 S.A.

UNITED STATES PATENT OFFICE
CERTIFICATE OF CORRECTION

Patent No. 3,682,771          Dated August 8, 1972

Inventor(s) JOHN CHARLES BENNETT

It is certified that error appears in the above-identified patent and that said Letters Patent are hereby corrected as shown below:

Assignor to British Nuclear Design & Construction Limited, Leicester, England

Signed and sealed this 20th day of February 1973.

(SEAL)
Attest:

EDWARD M. FLETCHER, JR.
Attesting Officer

ROBERT GOTTSCHALK
Commissioner of Patents